June 27, 1972 J. F. McCREERY 3,672,784
ADJUSTABLE TOOL
Filed Aug. 26, 1970 2 Sheets-Sheet 1
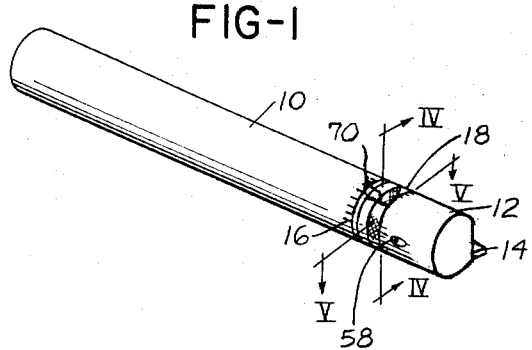
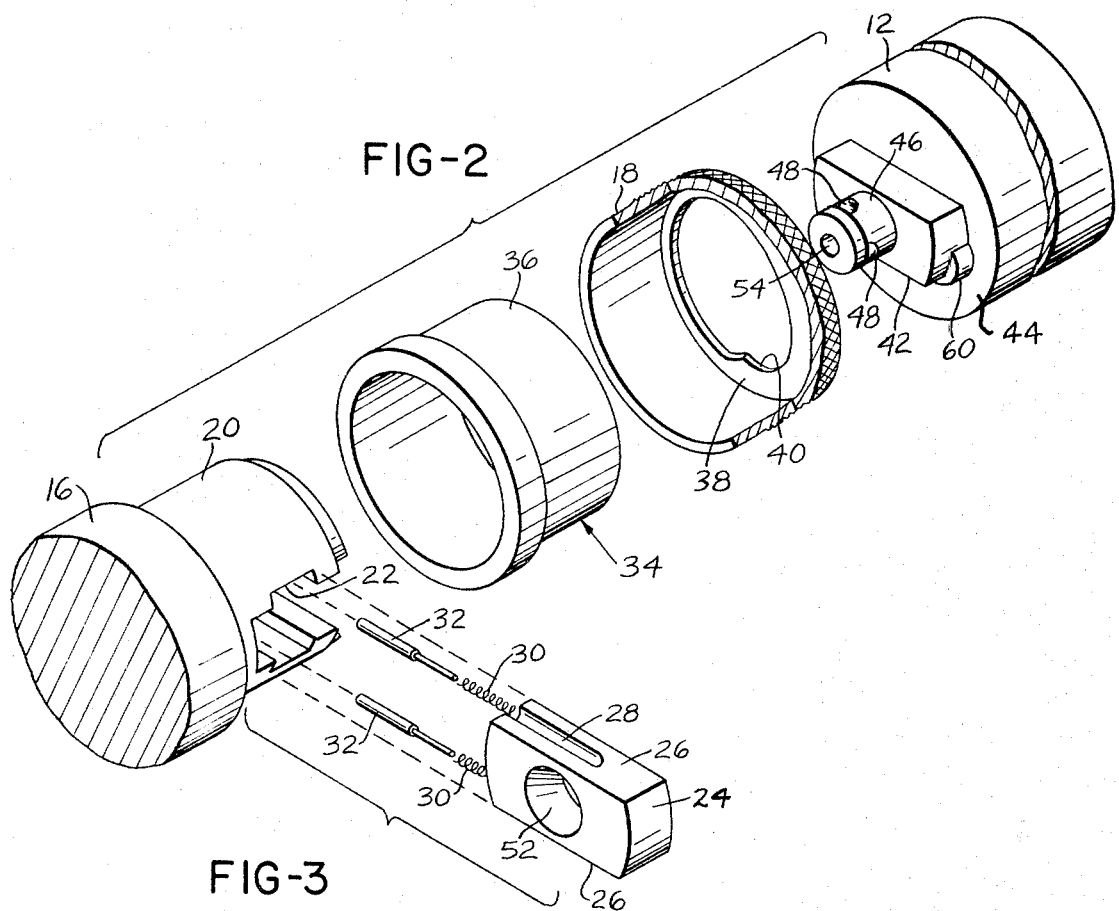
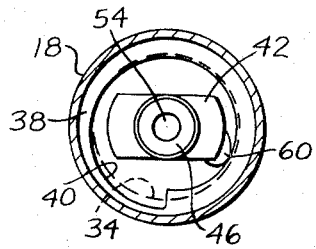
INVENTOR.
JAMES F. McCREERY
BY
Melvin A. Crosley June 27, 1972  J. F. McCREERY  3,672,784
ADJUSTABLE TOOL Filed Aug. 26, 1970  2 Sheets-Sheet 2

INVENTOR.
JAMES F. McCREERY
BY
Melvin D. Crosby

United States Patent Office 3,672,784
Patented June 27, 1972

3,672,784
ADJUSTABLE TOOL
James F. McCreery, Latrobe, Pa., assignor to
Kennametal Inc., Latrobe, Pa.
Filed Aug. 26, 1970, Ser. No. 67,071
Int. Cl. B23b 29/02
U.S. Cl. 408—178                    15 Claims

ABSTRACT OF THE DISCLOSURE

The specification discloses an adjustable tool, specifically, a boring bar in which the tool has a first member adapted for being fixedly supported and a second member adjustable on the first member and adapted for supporting a cutting tool such as a hard insert. The two members are adapted for being fixedly clamped together and are adjustable relatively in a direction laterally of the axis thereof while cooperating elements of a cam and follower are carried by the respective members to effect said lateral adjustment.

---

The present invention is concerned with tool arrangements and especially to adjustable tool arrangements.

In the machine tool art, many adjustable tools are employed so that the workpiece being cut can be formed to a predetermined size. A particular type of tool which is widely used in the machining art is a boring bar which one end is adapted for being fixedly clamped in the machine tool while the other end carries a hard cutting element for operating a workpiece.

Many arrangements have been proposed for effecting lateral adjustment of the cutting element on the tool but, heretofore, such adjustments have been relatively expensive and complex and have been lacking in permitting fine controlled adjustment and fixed clamping of the tool element in adjusted positions.

With the foregoing in mind, a primary objective of the present invention is the provision of an improved adjustable tool of the nature referred to.

Still another object of the present invention is the provision of a boring bar in which the cutting element carried thereby can be adjusted in the lateral direction of the bar.

It is also an object of the present invention to provide a boring bar in which the cutting element carried thereby can be adjusted in the lateral direction of the bar in a controlled and accurate manner fixedly clamped in place in any adjusted position.

Still a further object of the present invention is the provision of an adjustable boring bar of the nature referred to which is relatively inexpensive to construct and which is extremely strong and which supports the cutting element thereon solidly at all times.

A still further object of the present invention is the provision of an adjustable tool of the nature referred to in which the cutting element is carried by a part of the cutting tool which is separable in a simple manner from the remainder of the tool thereby to permit replacement of the cutting insert in a simple manner.

These and other objects and advantages of the present invention will become more apparent upon reference to the following detailed specification taken in connection with the accompanying drawings in which:

FIG. 1 is a perspective view showing a tool such as a boring bar constructed according to the present invention;

FIG. 2 is an exploded perspective view of the tool end of the boring bar of FIG. 1 showing the adjusting mechanism according to the present invention;

FIG. 3 is a sectional view looking in at the end of the tool holder portion of the boring bar showing the adjusting collar and the spiral cam track thereon that accomplishes the adjustment;

GENERAL SUMMARY OF THE INVENTION

Figure 4:
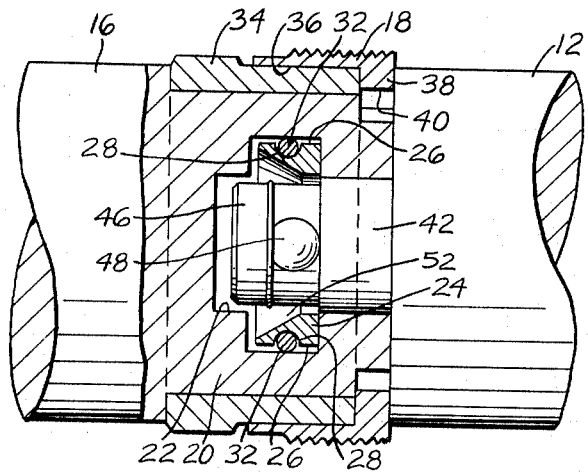
FIG. 4 is a vertical sectional view indicated by line IV—IV on FIG. 1.
Figure 5:
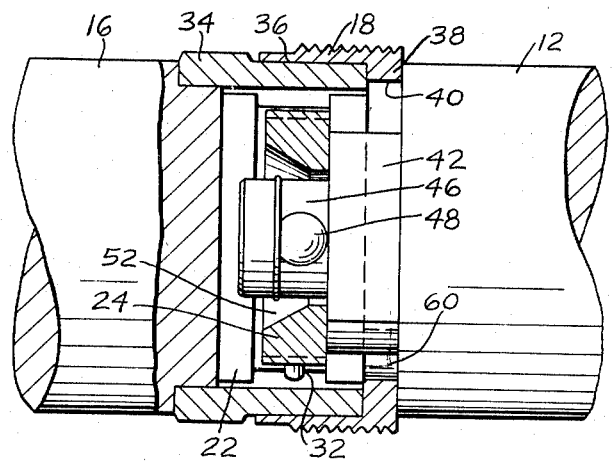
FIG. 5 is a plan sectional view indicated by line V—V on FIG. 1.

The tool according to the present invention has a support shank on the end of which is mounted a head part carrying the cutting element of the tool. The head part is laterally adjustable on the shank to adjust the precise position of the cutting edge of the cutting element.

According to the present invention, a tongue and grooving arrangement interconnects the shank with the head and a clamping arrangement is provided operable for fixedly clamping the head in adjusted positions on the shank while also permitting ready removal of the head from the shank.

A feature of the present invention is to be found in a cam and follower arrangement arranged between the shank and the head in which the cam is in the form of a rotatable ring so that, upon unclamping of the head, the ring can be rotated and thereby laterally adjust the head on the shank, whereupon the head can be clamped in adjusted position on the shank.

DETAILED DESCRIPTION

The adjustable tool holder according to the present invention comprises a support shank 10 which may, for example, be a boring bar adapted for being clamped in a suitable support. On the outer end of shank 10 is a member 12 adapted for supporting a cutting insert 14. Member 12 is mounted on a second member 16 interposed between member 12 and shank 10 and interposed between member 16 and member 12 is a knurled adjusting collar 18 which can be rotated to adjust member 12 laterally of the axis of shank 10.

In the case of a boring bar, shank 10 may be formed of a cemented carbide material, such as tungsten carbide, and members 12 and 16 are formed of a machinable steel with member 16 being fixedly connected to the end of shank 10 as by brazing, cementing, or clamping.

In FIG. 2 it will be seen that member 16 has a reduced diameter portion 20 extending toward member 12 which is formed with a cross shaped slot 22 extending diametrically thereof and open on the side toward member 12. Slidably fitted in the slot is a clamp ring 24, having a central hole and flatted on the opposite sides at 26 so as slidably but nonrotatively to fit within the slot 22.

The flats 26 are grooved as at 28 and receive compression springs 30 which bear on shouldered plungers 32 so that the springs and plungers bias clamp ring in one direction in slot 22. When clamp ring 24 and the springs and plungers are mounted in slot 22, a retaining collar 34 is placed on reduced diameter portion 20 and this serves to retain the clamping ring and springs and plungers in place in slot 22 and, also, provides a bearing for the ends of plungers 32.

Retaining collar 34 can be pinned or brazed or otherwise fixedly joined to member 16 but, functionally, the collar can remain loose on the reduced diameter portion of member 16 without interfering with the operation of the device.

Collar 34 has a cylindrical portion 36 on the end nearest member 12 adapted for rotatably receiving the adjusting collar 18. Adjusting collar 18 has a radially inwardly extending flange 38 on the end facing member 12 which is formed with a radially inwardly facing spiral cam surface 40.

Turning now to member 12, this member is formed with a transversely extending bar-like projection 42 receivable closely between the opposite sides of the open end of slot 22 in member 16. The area 44 on the end of member 12 facing member 16 is adapted for abutting the opposed face of adjusting collar 18.

Member 12 also comprises a central cylindrical portion 46 projecting from the outer side of projection 42 and receivable in the central hole in clamp ring 24. Portion 46 carries the radially displaceable balls 48 which, when moved outwardly in cylindrical portion 46 engage the periphery of the central hole in clamp ring 24 and fixedly retain member 12 in position on the member 16.

Figure 6:
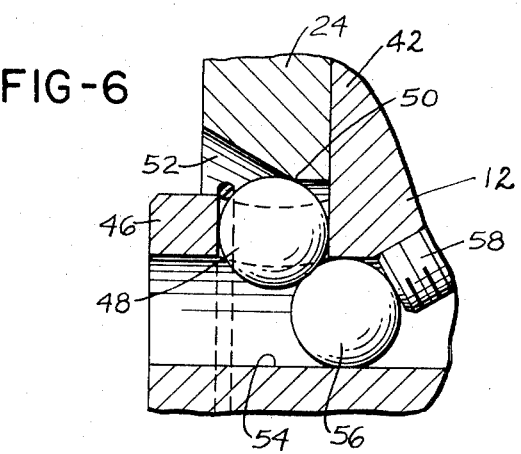
FIG. 6 is a fragmentary perspective view drawn at enlarged scale showing a detail of construction.

FIG. 6 shows the manner in which the balls 48 and the clamping ring 24 cooperate. In FIG. 6, it will be noted that when cylindrical portion 46 is in place, the central transverse plane of ball 48 is disposed to the left of a shoulder 50 formed in clamp ring 26 by the tapered counter bore 52.

Portion 46 is provided with a central bore 54 in which is disposed an actuating ball 56 engaged by the end of a clamp screw 58 threaded in member 12 with the screw head accessible from the outside. When member 12 is mounted on the end of member 16 with the cylindrical portion 46 extending through the hole in clamp ring 24, rotation of clamp screw 58 will move clamp ball 56 to the left and force balls 48 radially outwardly and into engagement with shoulder 50.

The balls 48 will not only fix member 12 in place but will also pull it back tightly against the end of adjusting collar 18 which will, in turn, take a firm bearing on the end of retaining collar 34 which abuts a shoulder on member 16.

Further, clamp ring 24 is drawn forwardly against the front wall of slot 22. The member 12 is thus held tightly in place on member 16 and, furthermore, is axially located and fixed thereon against rotation.

At one end of the bar-like projection 42 there is provided a raised region, or cam follower portion, 60 adapted for engagement with cam surface 40 in adjusting ring 18. By loosening clamp screw 58, the springs 30 and plungers 32 will be effective for biasing member 12 laterally so as to bring cam follower portion 60 against cam surface 40 and, thereafter, rotation of adjusting collar 18 will be operable for effecting fine lateral adjustment of member 12 on member 16.

When member 12 is adjusted to the desired position, the clamp screw 58 is again tightened up and member 12 will again be fixedly clamped in place on member 16.

If desired, cooperating elements of indicia could be placed on ring 18 and on member 10, as shown in FIG. 1 at 70. Such indicia would indicate the relative adjusted position of the members.

It will be noted that cam follower 60 is substantially diametrically opposite insert 14 so that cutting loads lateral of the bar are firmly supported. Insert 14 is a conventional insert having parallel top and bottom faces and is mounted in a conventionally shaped pocket having a bottom support wall parallel to the bottom face of the insert and substantially parallel to the direction of the length of bar-like projection 42.

Modifications may be made within the scope of the appended claims.

I claim:

1. In an adjustable tool, a first member for connection to a support, a second member for supporting a cutting element, said members being disposed in end to end relation, a linear slot in one of said members and a bar-like projection on the other of said members fitted into said slot, a ring rotatable on one of said members and having a radially inwardly facing circumferential cam surface thereon and a follower element fixed to the other of said members in the plane of said cam surface and disposed near one end of said projection, spring means acting between said members in the direction of the length of said projection and urging said follower element toward said cam surface, said ring being rotatable for adjusting said members relatively in the direction of the length of said projection, and clamp means selectively operable for fixedly clamping said members together in adjusted relative positions thereof.

2. An adjustable tool according to claim 1 in which said clamp means includes a first clamp element held against axial movement on the one of said members having said slot but slidable thereon in the direction of the length of said slot, a second clamp element fixed to the one of said members having said projection thereon, said clamp elements interengaging, and actuating means cooperating with said clamp elements for clamping said clamp elements together thereby to fix said members together or for releasing clamp elements for relative adjustment of said members.

3. An adjustable tool according to claim 2 in which one of said clamp elements has a hole therein with a shoulder facing away from the other of said clamp elements, said other clamp element having a pin part receivable in said hole, wedge elements carried by said pin part and moveable into wedging engagement with said shoulder, and said actuating means comprising screw threaded means operatively associated with said wedge elements and selectively operable for actuating said wedge elements into clamping engagement with said shoulder and for releasing said wedge elements from clamping engagement with said shoulder.

4. An adjustable tool according to claim 1 in which said first member is a bar and has said slot therein, said slot comprising an axial portion extending into the bar from the end and a diametral portion intersecting said axial portion in a region spaced from the end of the bar, said clamp means comprising a bar-like clamp element closely slidably fitting said diametral portion of said slot, said second member having said projection thereon and said projection closely slidably fitting said axial portion of said slot, a hole in said clamp element having a shoulder facing away from the said end of the bar, a pin portion on said projection receivable in said hole and having radially moveable wedge elements adapted to engage said shoulder, said ring being rotatable on said end of said bar, said follower element being carried by one end of said projection, said spring means acting on said clamp element, and said clamp means including screw threaded means in said second member operable for adjusting said wedge elements radially in said pin portion.

5. An adjustable tool according to claim 4 in which said first member has the said end adjacent said second member reduced in diameter, and a collar on the reduced diameter portion of said first member and closing the diametrically opposite ends of said slot, said ring being rotatably mounted on said collar.

6. An adjustable tool according to claim 5 in which said bar-like clamp element has recess means extending lengthwise therein from one end thereof toward but terminating short of the other end thereof, said spring means being mounted in said recess means, and plunger means having one end engaging the inside of said collar and the other end engaging said spring means.

7. An adjustable tool according to claim 5 in which said ring comprises a radial flange at one end disposed between the opposed ends of said collar and said second member and having the said cam surface formed on the radially inner extremity thereof.

8. An adjustable tool according to claim 7 in which said cam surface is in the form of a spiral when viewed axially of said ring.

9. An adjustable tool according to claim 4 in which said wedge elements are in the form of clamping balls in radial bores in said pin portion, an axial bore in said pin portion and a further ball therein engaging said clamping balls, said screw threaded means comprising a screw in said second member having an inner end engaging said further ball and adapted to move said further ball axially in said axial bore, said screw having an outer exposed end engageable by a tool.

10. An adjustable tool according to claim 9 in which said clamping balls have the centers thereof in a plane transverse to the axis of said pin portion and disposed on the larger diameter side of said shoulder when said members are in assembled relation whereby tightening of said screw will draw said members axially toward each other.

11. An adjustable tool according to claim 6 in which said recess means comprises a notch in each of the opposite sides of said bar-like clamping element, said spring means comprising a spring in each notch, and said plunger means comprising a plunger in each notch.

12. An adjustable tool according to claim 7 in which said ring and one of said members have cooperating elements of indicia thereon for indicating the rotated position of said ring.

13. An adjustable tool according to claim 12 in which said elements of indicia are on the end of said ring adjacent said second member and on said second member adjacent said ring.

14. An adjustable tool according to claim 1 in which said second member on the end thereof opposite said first member is formed with a pocket for a cutting insert, said pocket being adapted for supporting a cutting insert having an upper face substantially parallel to the direction of relative movement of said members.

15. An adjustable tool according to claim 14 in which said follower element is at the end of said projection which is opposite said pocket.

References Cited
UNITED STATES PATENTS 2,784,617    3/1957    Bretz _____ 408—178

FOREIGN PATENTS 584,358    10/1959    Canada _____ 408—178

GIL WEIDENFELD, Primary Examiner